(12) United States Patent
Ambiehl et al.

(10) Patent No.: US 6,985,500 B2
(45) Date of Patent: Jan. 10, 2006

(54) METHOD FOR THE SIZING OF A DETERMINISTIC TYPE PACKET-SWITCHING TRANSMISSION NETWORK

(75) Inventors: Yves Ambiehl, Toulouse (FR); Ahlam Yvetot, Toulouse (FR); Christian Sannino, Toulouse (FR)

(73) Assignee: Thales, Paris (FR)

( * ) Notice: Subject to any disclaimer, the term of this patent is extended or adjusted under 35 U.S.C. 154(b) by 897 days.

(21) Appl. No.: 09/998,210

(22) Filed: Dec. 3, 2001

(65) Prior Publication Data

US 2002/0122421 A1 Sep. 5, 2002

(30) Foreign Application Priority Data

Dec. 1, 2000 (FR) .................................. 00 15606

(51) Int. Cl.
*H04J 3/06* (2006.01)
(52) U.S. Cl. ........................................ 370/516; 370/409
(58) Field of Classification Search ................ 370/229, 370/235, 254, 351, 389, 397, 399, 400, 409, 370/412, 413, 464, 474, 503, 516
See application file for complete search history.

(56) References Cited

U.S. PATENT DOCUMENTS

| | | | |
|---|---|---|---|
| 5,717,878 A | 2/1998 | Sannino | |
| 5,724,343 A | 3/1998 | Pain et al. | |
| 6,212,171 B1 * | 4/2001 | LaFollette et al. | 370/257 |
| 6,442,141 B1 * | 8/2002 | Borella et al. | 370/248 |
| 6,765,873 B1 * | 7/2004 | Fichou et al. | 370/235 |
| 6,862,298 B1 * | 3/2005 | Smith et al. | 370/516 |
| 2002/0087370 A1 * | 7/2002 | Brueckheimer et al. | 705/7 |

FOREIGN PATENT DOCUMENTS

| | | |
|---|---|---|
| EP | 0 579 472 A2 | 1/1994 |
| EP | 0 579472 A2 | 1/1994 |

OTHER PUBLICATIONS

Fergal Somers, et al. "Intelligent Resource Dimensioning in ATM Networks" Proceedings of the International Switching Symposium. Symp. 15, Apr. 23,1995, pp. 62-68.

* cited by examiner

*Primary Examiner*—Huy D. Vu
*Assistant Examiner*—Jason Mattis
(74) *Attorney, Agent, or Firm*—Oblon, Spivak, McClelland, Maier & Neustadt, P.C.

(57) ABSTRACT

Deterministic type packet-switching transmission networks are networks in which the different flows of information follow virtual paths defined in advance for which any change requires a reprogramming of the interconnection nodes. The advantage of determinism is that it makes it easier to estimate the maximum delay time that the packets may undergo during their journey in the network. However, it remains to be verified that the network is appropriately sized for the transmission of the different information flows, with the constraints of maximum delay times and of regularity imposed by the connected items of equipment. A method is proposed here for the sizing of the network. In this method, the verification of compliance with these constraints is based on the determining of the jitter components added by the different interconnection nodes of the network, at their different output ports. This determination is done incrementally, in descending along the virtual paths travelled through by the different information flows.

4 Claims, 4 Drawing Sheets

METHOD FOR THE SIZING OF A DETERMINISTIC TYPE PACKET-SWITCHING TRANSMISSION NETWORK

BACKGROUND OF THE INVENTION

1. Field of the Invention

The present invention relates to deterministic type packet-switching transmission networks.

A packet-switching transmission network enables the exchange of data in the form of packets between different geographically dispersed entities. Its value lies in the fact that it reduces the number of physical transmission links needed to convey information by enabling the time-sharing of one or more physical links by several information flows on certain portions of their paths.

A packet-switching transmission network consists of a set of interconnection nodes joined by transmission links that may or may not be wired. These nodes constitute a meshing of the space in which the entities that have to communicate are distributed.

A packet takes the form of a bit stream whose constitution complies with a strict organization, defined by a network, having different parts or fields. Some of these parts or fields are reserved for service information needed to convey the packet, for example the identities of the sender entity and the addressee entity. Other parts or fields are reserved for the data to be transmitted.

A packet is introduced into the transmission network at one of its interconnection nodes directly linked with the sender entity or by means of a physical transmission link such as a cable or other type of link. It travels up to the first interconnection node through the physical link connecting this first node to the sender entity. Once it reaches this first interconnection node, it is rerouted to another physical transmission link. This other physical transmission link makes this packet move forward gradually within the transmission network toward the addressee entity and enables it to reach either the addressee entity or another connection node of the network closer to the addressee identity. This other node, in turn, reroutes it to another physical transmission link, and so on and so forth. In actual fact, the packet, in its journey up to the addressee entity, follows a path that is called a virtual path because it does not take concrete form except for the time during which the packet is being transmitted. This virtual path follows a variably lengthy chain of physical transmission links joined at their ends by interconnection nodes. Each interconnection node, at its level, routes the packets that reach it between the different physical transmission links that are directly connected to it. This routing is done by means of the service information contained in the packets. A very widespread example of packet-switching networks is that of switched Ethernet networks.

In a packet-switching transmission network, the activity of the interconnection nodes is highly variable and depends on the routing of the packets. Thus, at certain points in time, there may be interconnection nodes that are close to saturation or even saturated, prompting the loss of packets, while the other interconnection nodes will be under-exploited. This has led to the real-time monitoring of the activities of the different connection nodes and to the adoption of various procedures for the local rerouting of the packets so as to better distribute the tasks between the different interconnection nodes. The price paid for this local rerouting is that the virtual path followed by a packet from its sender entity to its addressee entity is no longer fully defined in advance. This makes transmission less reliable. Above all, it adds a random factor to the time taken for a piece of information to travel through the network. In a certain number of situations, where the reliability of the transmission and the information transit time are critically important data, as in the case of the transmission network connecting the different items of equipment of an aircraft, this local rerouting is avoided, and each connection node contains a table that strictly defines the output port to be taken by a packet as a function of its input port and of the sender address and the addressee address. The packet-switching transmission network is then called a "deterministic" network because the virtual paths that may be taken by the packets are fixed and, in order to be modified, require reprogramming of the interconnection nodes and because the time taken to cross each interconnection node is limited.

2. Description of the Prior Art

However, it is not enough for the packet-switching transmission network to be deterministic in order to ensure its reliability. This network should also be sized in such a way that it is adapted to the flow of information to be transmitted, i.e. in such a way that there is no possibility of its being congested at its interconnection nodes.

An interconnection node may be symbolized by a device having:

a bank of input ports $E_i$, with I ranging from 1 to n, a bank of output ports, $S_j$, with j ranging from 1 to n, a bank of multiplexers $P_j$, one per output port $S_j$, each multiplexer $P_j$ being assigned to a determined output port $S_j$ and connecting, to its assigned output port $S_j$, all the input port's $E_i$ that could be connected to it, a bank of FIFO (First In First Out) type memories $F_j$, interposed between the outputs of the multiplexers and the output port $S_j$ to manage the queues directly leading to the output ports and to regularize the bit rates of the packets on the physical transmission links connected to the output port $S_j$, and one or more routing automations providing for the control of the multiplexer or different multiplexers as a function of the service information contained in the packets.

This representation of an interconnection node is designed solely for easier understanding. It does not prejudge the real architecture in which there may be only one central multiplexer that routes the flows arriving from the input ports to the appropriate output ports.

The problem of the congestion of an interconnection node brings us to that of the management of the queues, namely the occupancy rates and the risks of overflow of the FIFO memories positioned directly on output ports of the interconnection node. The transmission network must be sized so that the FIFO memories of its different interconnection nodes cannot overflow and so that they have uniform capacities and filling rates, the time taken to route a packet to an interconnection node consisting essentially of its time of stay in the queue of the output port that it takes.

The sizing of a deterministic type of packet-switching transmission network is done by a process of rough trimming and revision. The operation starts from a network topology assumed to be adapted to the geographical position of the pieces of equipment to be connected and to the size of the information flows to be exchanged. This network topology consists of the definition of virtual paths VC for conveying the different information flows, and of the meshing of interconnection nodes connected to one another and to the items of equipment by physical connection links that carry these virtual paths. It is ascertained then that the number, capacities and arrangements of the interconnection nodes and of the physical transmission links connecting the interconnection nodes to one another and to the sender and addressee entities enable problem-free passage along all the planned virtual paths. The topology of the network is revised so long as this verification does not give satisfactory results.

The packets of an information flow: coming from one and the same sender entity and occupying one and the same virtual path EC originally occupy periodic time windows that are highly spaced out with respect to the transmission capacities of the physical links used by a network. However, as soon as they pass through a first interconnection node, they enter into competition with packets belonging to other information flows following other virtual paths and may therefore be forced to wait in queues at the output port that they have to take. Such a passage through a queue disturbs the regularity of the initial bit rate of the packets. This disturbance or jitter increases with the connection nodes crossed and may ultimately give rise to packet aggregates and bursts along the virtual paths. These packet aggregates, when they go through a connection node, cause a temporary increase in the activity of this connection node. This temporary increase in activity is absorbed by the queues and gives rise to fresh delays and a possible increase in the aggregates. This phenomenon of aggregates must be taken into account when counting the virtual paths and determining the capacities of the FIFO memories of the interconnection nodes for it affects the maximum transmission time for a virtual path and the filling of the queues in the interconnection nodes.

SUMMARY OF THE INVENTION

The present invention is aimed at providing a method for the sizing of a deterministic type of packet-switching transmission network taking account of the phenomenon of the aggregation of packets during their progress in the network along a virtual path.

An object of the invention is a method for the sizing of a deterministic type of packet-switching transmission network serving items of equipment to be interconnected and comprising interconnection nodes connected to one another and to the items of equipment by physical connecting links, this method consisting in setting up a list of the information flows to be conveyed between the different pieces of equipment connected by the network, proposing a network topology assumed to be adapted to the geographical layout of the items of equipment to be connected by the network and to the size of the information flows to be exchanged between the items of equipment, said network topology consisting of the definition of the virtual paths for the transportation of the different information flows and of a meshing of interconnection nodes connected to one another and to the items of equipment by physical connection links that carry these virtual paths, estimating, at each connection node, the maximum delays introduced into the transmissions of the packets by jitter phenomena prompted by themselves and by the connection nodes already crossed by the packets, ascertaining that these maximum delays are compatible with the delays imposed and revising the topology of the network so long as this compatibility is not obtained, wherein, in a network where the packets all have the same speed of transportation V on the physical connection links, the estimation of the maximum delays introduced by the jitter phenomenon into the transmission of the packets on the different virtual paths is based on the determining of the jitter component $\Delta J_K$, added by an interconnection node K to one of its output ports $S_j$ linked by means of a buffer memory, receiving a queue, and of a multiplexing device, with N flows coming from the input ports $E_i$, this determination of the component of the jitter $\Delta J_K$, being done when each packet of a virtual path $VC_i$ entering the buffer memory by an input port $E_i$ has, between an aggregate of packets and the following packet or aggregate of packets, a minimum time interval sufficient to empty the buffer memory after reception of an aggregate of packets and before reception of the packet following the aggregate by the implementation of the following relationship:

$$\Delta J_{K_j} = \frac{Q}{V} = \frac{\sum_{l=1}^{N} B_l - \text{Sup}\{B_l\}}{V}$$

V being the speed of transportation on the physical connection link connected to the output port $S_j$ and Q being the maximum quantity of bits of the queue estimated from the relationship:

$$Q = \sum_{l=1}^{N} B_l - \text{Sup}\{B_l\}$$

N being the number of packet liable to converge on the output port considered, namely the number of flows crossing the interconnection node and converging on the output port $S_j$ considered, assuming that a packet flow is associated with a virtual path $VC_i$, $B_i$ being the maximum size in bits of an aggregate of packets likely to reach a $VC_i$ by an input port $E_i$, it being also possible to express this maximum size by the relationship:

$$B_i = M_i \times q_{max}$$

$M_i$ being the maximum number of packets in an aggregate of packets capable of arriving at the virtual path $VC_i$ through an input port $E_i$ and $q_{max}$ being the maximum number of bits of a packet.

Advantageously, the maximum size $B_i$ in bits of an aggregate of packets likely to arrive at a virtual path $VC_i$ by an input port $E_i$ of an interconnection node of the network is taken to be equal to the size of the greatest aggregate of packets $B_{VC_{l,i,k}}$ that may arise on this virtual path $VC_i$ that takes the input port $E_i$ of the connection node K considered:

$$B_l = \text{Sup}\{B_{VC_{l,i,k}}\}$$

The size of the biggest aggregate of packets $B_{VC_{l,i,k}}$ that may arise on a virtual path $VC_i$ that takes the input port $E_i$ of the connection node K considered being obtained from the system of relationships:

$$\begin{cases} B_{VC_{l,i,k}} = 1 + \text{integer part}\left(\dfrac{\sum_{k=1}^{K-1} \Delta J_{l,k}}{T_l}\right) \times q_{max} & \text{for } \sum_{k=1}^{K-1} \Delta J_{l,k} \geq T_l et \sum_{k=1}^{K-1} \Delta J_{l,k} < T_l \dfrac{q_{max}}{V} \\ B_{VC_{l,i,k}} = 2 & \text{for } T_l - \dfrac{q_{max}}{V} \leq \sum_{k=1}^{K-1} \Delta J_{l,k} < T_l \end{cases}$$

K herein being the number of connection nodes crossed by a virtual path considered and the index k identifying the connection nodes crossed by a virtual path considered in the order in which they are crossed by the packets, the different jitter components $\Delta J_{l,k}$ being determined from one to the next in travelling through the different virtual paths from their original points to their end points.

Advantageously, once the jitter components added by the different interconnection nodes at their different output ports have been determined, it is verified, on each virtual path $VC_i$, that the minimum time intervals $\Delta T_{l,K}$ between the biggest aggregate of packets and the next packet that reaches the different interconnection nodes at the earliest, obtained by the relationship:

$$\Delta T_{l,k} = T_l - \text{Remainder}\left(\dfrac{\sum_{k=1}^{K-1} \Delta J_{l,k}}{T_l}\right)\dfrac{B_{VC_{l,k,j}}}{V}$$

are sufficient to prevent any problem of congestion of the queues caused by bursts excessively close to each other, i.e. they meet either the inequality:

$$\Delta T \geq (M-1)\dfrac{q_{max}}{V}$$

M being a positive integer representing the number of packets of the second burst at most equal to the number of virtual paths taking the output port of the interconnection node considered, chosen as a function of the degree of security required for the transmission, or the inequality for a virtual path $VC_k$:

$$\Delta T_k \geq (M-1)\dfrac{q_{max}}{V} + \dfrac{\underset{1 \leq l \leq N}{\text{Sup}}\{\text{Max aggregate size}_{VC_l}\}}{V} - \dfrac{\text{Max aggregate size}_{VC_k}}{V}$$

BRIEF DESCRIPTION OF THE DRAWINGS

Other features and advantages of the invention shall appear from the following description of an embodiment given by way of an example. This description is made with reference to be appended drawings, wherein.

MORE DETAILED DESCRIPTION

Figure 1:
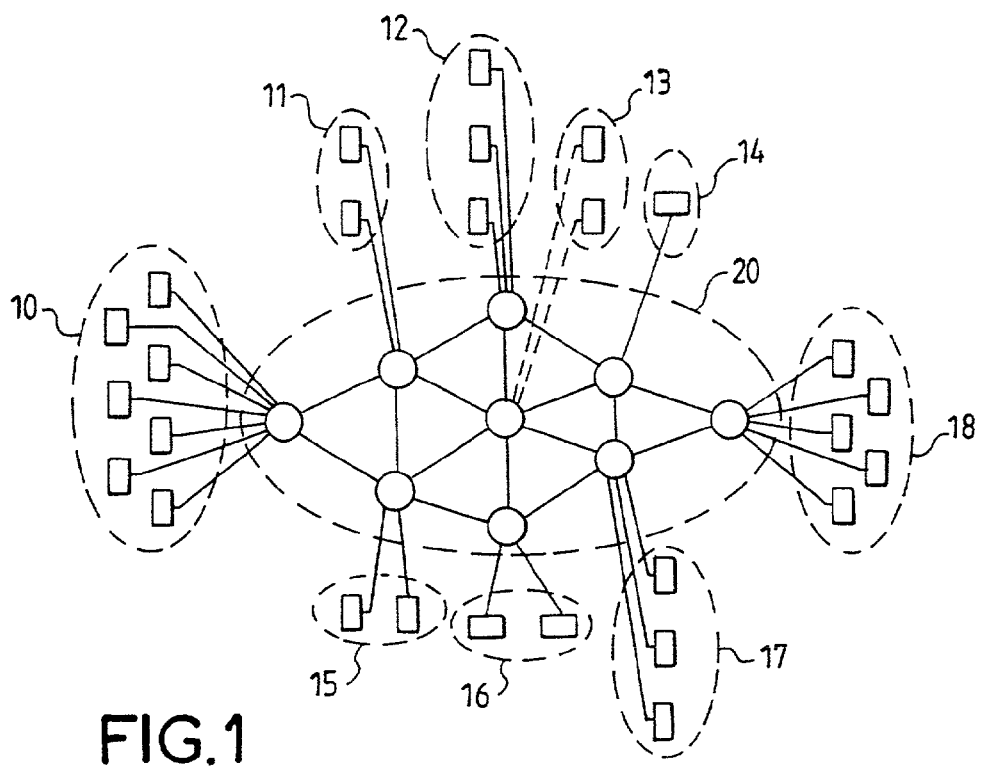
FIG. 1 shows an exemplary topology of a packet-switching transmission network.

FIG. 1 shows various sets of equipment 10 to 18 that communicate with one another by means of a packet-switching transmission network 20. The sets of equipment 10 to 18 are unequal in size and are geographically dispersed over a zone covered by the packet-switching transmission network 20 which is schematically represented by a mesh of interconnection nodes represented by circles and physical interconnection links represented by straight-line segments joining the interconnection nodes to one another. Each piece of equipment represented by a rectangle is connected to the packet-switching transmission node, at one or more interconnection nodes placed in the vicinity, by one or more physical interconnection links.

The packets are sent in the network by the sender periodically. Each packet is inserted into a time window and two successive packets occupy two successive windows. Each packet complies with a certain formalism or protocol that depends on the transmission network. As a general rule, it is structured into bit fields. Some of these bit fields are reserved for the service information needed for the transportation of this packet such as, for example, the identities of the sender entity and the addressee entity. Other fields are reserved for the data to be transmitted. When starting out from a piece of equipment, the packets occupy regularly spaced-out time windows on the physical interconnection link that leads them to a first interconnection node of the network. Each packet, when it reaches this first interconnection node, is subjected to a routing that consists of an analysis of its service information fields to determine the output port by which the packet must leave the node. Each packet is then directed towards the queue of the output port concerned. The queue is indispensable because a packet may be in a state of contention, namely a state of competition, at the output port, with other packets coming from other input ports of the connection node. The memory made in FIFO form can be used to store these packets pending their turn to be sent. After a certain waiting period that depends on the size of the queue at the time of its passage, the packet is sent on the physical interconnection link that takes it to the addressee equipment either directly or by means of other interconnection nodes and other physical interconnection links.

Figure 2:
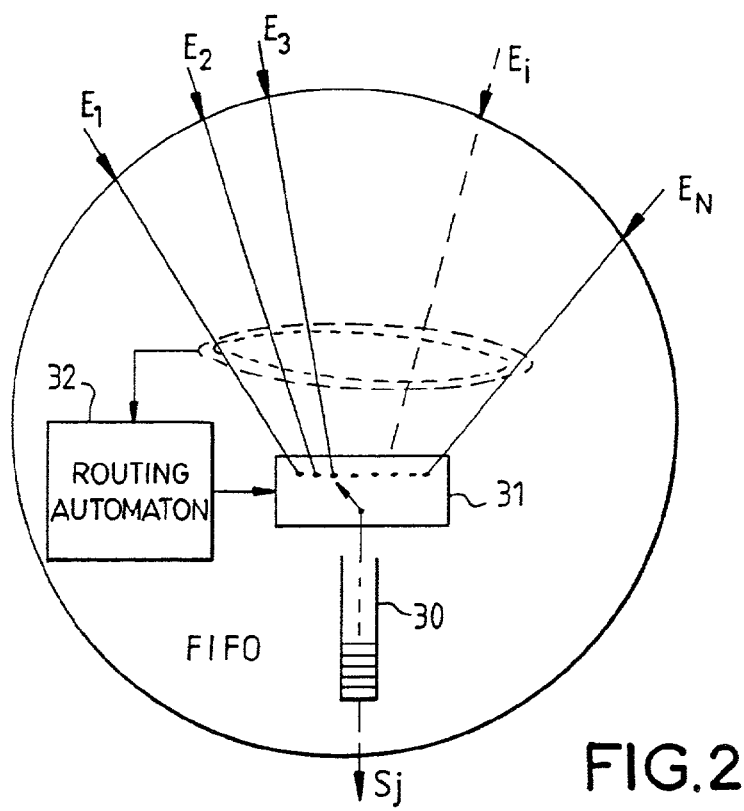
FIG. 2 is a schematic view of an interconnection node of the above transmission network seen from one of its output ports.

FIG. 2 models an interconnection node seen from one of its output ports $S_j$. The figure shows, upline from the output port $S_j$, a FIFO (First In First Out) type memory 30, supplied with packets by a multiplexer 31 connected to the various input ports $E_1$, $E_2$, $E_i$, $E_N$ from which the packets could be directed to the output $S_j$. The multiplexer 31 is controlled by a routing automaton 32 that captures the packets coming to the input ports of the interconnection node, analyses their service information fields and determines the output port by which they must leave the interconnection node.

The presence of the queue upline from each output port of an interconnection node raises the problem of its management, namely the constraints to be placed on the traffic supplying this queue, so that it remains limited and the estimation of its maximum size when these constraints are met. Indeed, an overflow of a queue may give rise to a loss of packets while the maximum size of a queue determines the maximum delay that a packet may undergo when it travels through the output port associated with the queue.

To appreciate the properties of a queue placed in an interconnection node upline from an output port, we take first of all the favorable situation of an output port of a first-level interconnection node that receives two regular flows of packets reaching two distinct input ports. The term "regular" means that these two packet flows have not previously crossed any other interconnection node where they could have passed through a queue. Consequently, they are not yet affected by jitter, their packets succeeding one another at regular rates.

Figure 3:
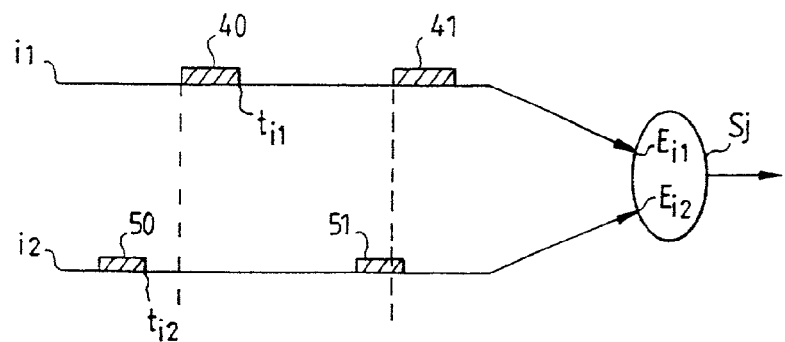
FIG. 3 illustrates the phenomenon of congestion that may occur at the confluence of two regular packet flows and that warrants the presence of a queue upline from an output port of an interconnection node.

Let us take, as shown in FIG. 3, two regular flows i1 and i2 that arrive with a speed V and a periodicity $T_{i1}$ for the flow i1 and $T_{i2}$ for the flow i2 at two ports $E_{i1}$ and $E_{i2}$ of a first-level connection node and are then directed to the same output port $S_j$. The packets of the flow i1 consist of $q_{i1}$ bits and the packets of the flow i2 consist of $q_{i2}$ bits. Two cases may occur at the output $S_j$ of the interconnection node:
  either the incoming packet of the flow i1 and the incoming packet of the flow i2 occupy non-overlapping time windows, the size of the window being equal at this level to the duration of the packet since the packet has undergone no jitter. In this case, they are said to be non-competing and are directed to the common output port without undergoing any delay. The packets 40 and 50 are an example of non-competing packets,
  or the incoming packet of the flow i1 and the incoming packet of the flow i2 occupy time windows that overlap on at least one bit. They are then said to be in competition. The packet that is second in time must wait for the end of processing of the first packet in a queue before it can be directed to the output port. The packets 41 and 51 are an example of packets in contention or competition.

Let us take two non-competing packets, one received first by the interconnection node on the data of reception $T_{i1}$ and the other received second on the date of reception $T_{i2}$, the property of non-competition being expressed by the following condition:

$$t_{i2} \geq t_{i1} + \frac{q_{i1}}{V}$$

$q_{i1}$ being the size in bits of a packet of the flow i1, in fact the size of the packet received first, while the phenomenon of contention is expressed by the condition:

$$t_{i2} < t_{i1} + \frac{q_{i1}}{V}$$

When two packets are in contention, the second is delayed for the time needed to process the first one and goes to the output immediately after the first one without leaving any time window free between the two. The second packet, with the first, then forms an aggregate of two packets. The packet aggregation phenomenon increases from interconnection node to interconnection node on the path of an information flow. Thus, when a packet flow reaches the input of an interconnection node of a level below the first level, it may contain varyingly sized aggregates of several packets resulting from the routings undergone by the packets in these interconnection nodes encountered upline. These aggregates disturb the bit rates of the packet flows by adding jitter to them and causing sudden increases in activity at the interconnection nodes.

Figure 4:
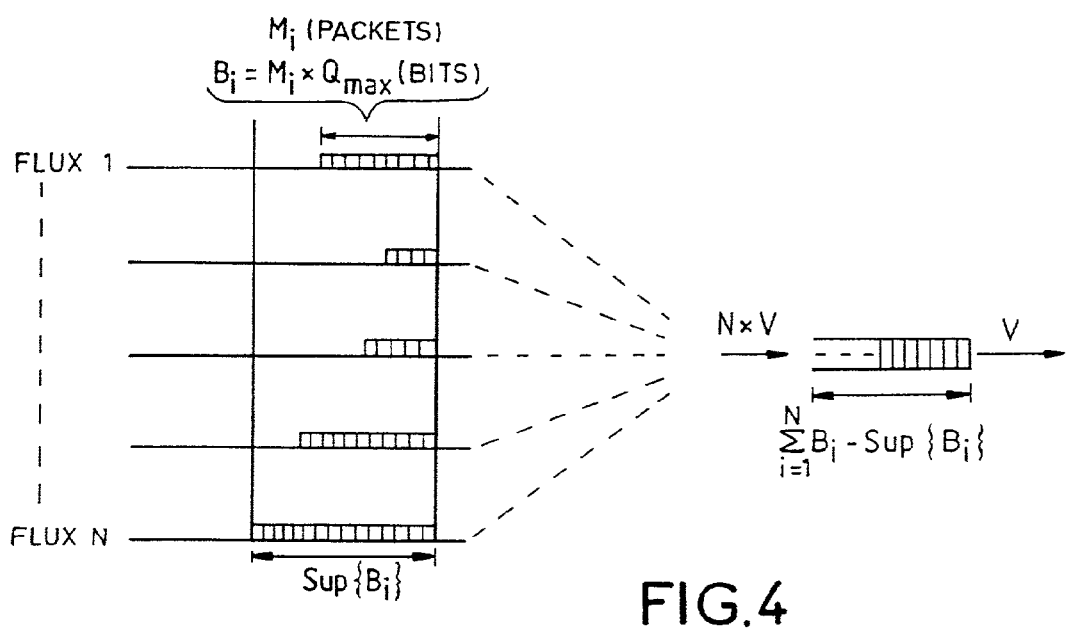
FIG. 4 illustrates the same phenomenon of congestion as FIG. 3 but is extended to the confluence of N flows comprising packet aggregates.

To appreciate this phenomenon, we shall assume a situation closer to reality, as illustrated in FIG. 4. We shall assume an output port of a lower-level interconnection node receiving a burst of N aggregates of contending packets coming from N distinct packet flows reaching the interconnection node at the same transmission speed V by N distinct inputs. These N packet aggregates must wait in a queue, upline from the output port, in order to be sent, each in its turn, on the physical interconnection link connected to the output port.

Assuming:
  that the maximum size, in numbers of bits, of an authorized packet in the network is $q_{max}$,
  that the maximum size of an aggregate, in numbers of packets, coming from the ith flow is $M_i$ so that the maximum size in bits $B_i$ of an aggregate coming from an ith flow is equal to:

$B_i = M_i \times q_{max}$ that the set of flows reaches the queue at the apparent speed NV, and
  that the queue empties at the speed V,
  the maximum quantity Q of bits liable to wait in the queue is at most:

$$Q = \sum_{i=1}^{N} B_i - \mathrm{Sup}\{B_i\} \tag{1}$$

$\mathrm{Sup}\{B_i\}$ being the size in bits of the biggest aggregate among these N input flows, i.e. the sum of the bits of all the aggregates minus the bits of the biggest aggregate, which may be any one of them. If all the aggregates have the same size B, the maximum quantity of bits that could wait in the queue is equal to:

$$Q=(N-1)B$$

From the maximum quantity of bits liable to wait in the queue, we deduce the maximum period that may be introduced into the transmission of the packets by the crossing of the interconnection node considered; this maximum period corresponds to the increase in jitter ΔJ given by the interconnection node to the flows of packets:

$$\Delta J = \frac{Q}{V} = \frac{\sum_{i=1}^{N} B_i - \text{Sup}\{B_i\}}{V} \quad (2)$$

In order that this maximum quantity of bits liable to wait in a queue is not exceeded, the queue should have the time, between two bursts, to empty itself sufficiently to receive the bits of the bursts to come. This time corresponds to a minimum time ΔT between two bursts. If we consider only one flow, the minimum time $\Delta T_i$ required between a first aggregate $B_i$ and a second aggregate $B_i'$ must meet the following condition:

$$\Delta T_i \geq \frac{B_i'}{V} \quad (3)$$

Figure 5:
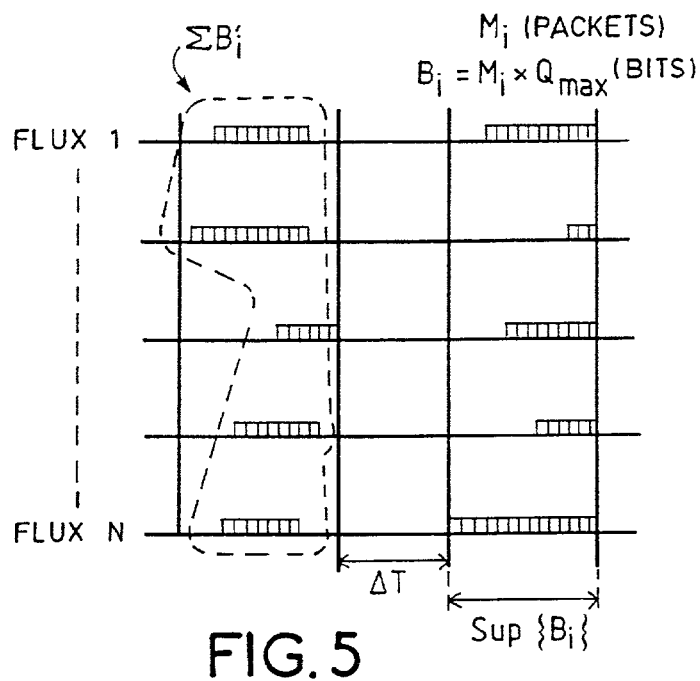
FIG. 5 illustrates the need for a minimum time interval between two packet bursts on N. flows arriving at a confluence on one and the same output port to prevent a possibility of overflow of the queue regulating the output port.

In the more general case illustrated in FIG. 5, where a burst of N aggregates $B_i'$ arriving simultaneously on N flows follows a burst of N aggregates $B_i$ that have already simultaneously reached N flows, the minimum time ΔT between the two bursts must meet the condition:

$$\Delta T \geq \frac{\sum_{i=1}^{N} B_i'}{V}$$

On the strength of these considerations relating to the crossing of an interconnection node by packet flows, we shall now go on to the virtual paths, namely the routes effectively taken in the transmission network by the different information flows exchanged between the pieces of equipment connected to the transmission network. In the case of a deterministic type of packet-switching transmission network, these virtual paths are invariant, with all the packets of one and the same flow undergoing the same routing through the interconnection nodes of the network. The maximum time for the reception, by an addressee piece of equipment, of a message sent through the transmission network by a sender piece of equipment may then be assessed from the maximum time for the transmission of the packets on the virtual paths that connect them through the network.

Figure 6:
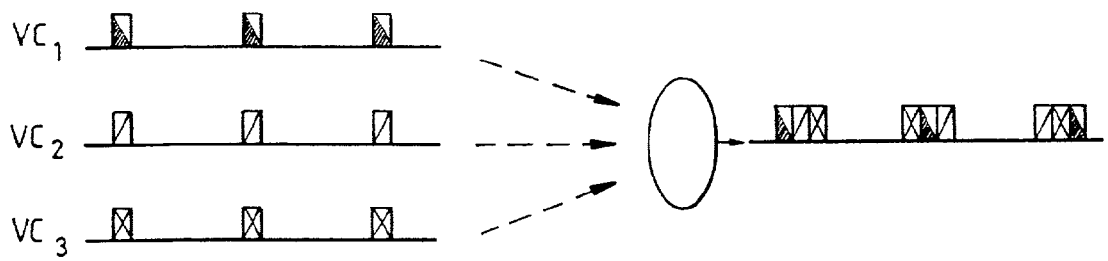
FIG. 6 shows the origin of the jitter phenomenon affecting a regular flow of packets when it makes a confluence with two other regular flows of packets.

The starting assumption is that the traffic of a virtual path VC is always regulated at its source so that there is a minimum time T between two of its successive packets. As can be seen in FIG. 6, the crossing of the first interconnection node by the packets following a virtual path $VC_i$ is expressed by the appearance of jitter due to the phenomenon of contention at this interconnection node with packets following other virtual paths that take the same output port.

As a result of this phenomenon of contention, a packet following a virtual path VC may find itself at the output of an interconnection node within an aggregate of packets following other virtual paths and at any position within this aggregate. The possibility of aggregation at the crossing of a first-level interconnection node makes the width of the time window, in which a packet may be placed, go from the maximum width of a packet at the outset of the virtual path VC to the width of the biggest possible aggregate and introduces a phenomenon of jitter since the length of the packet does not vary but its position is shifted from its transmission window by an unforeseeable delay for which only the upper limit is known. This jitter corresponds to the maximum delay that the packet may undergo when crossing the interconnection node since it can cross it without any delay if the conditions are favorable to it or with the maximum delay if the conditions are particularly unfavorable to it. In the example of FIG. 6, the position of the window of a packet which was certain before the first level interconnection node and corresponded to the transmission window becomes uncertain after the interconnection node. The uncertainty covers the duration of three packets.

The jitter undergone by the packets following a determined virtual path increases as and when the interconnection nodes are crossed. More specifically, the jitter $J_{I,K}$ affecting a packet flow following a virtual path $VC_i$ at the output of the Kth interconnection node encountered is equal to the sum of the jitter components provided by all the interconnection nodes crossed:

$$J_{I,k} = \sum_{p=1}^{K} \Delta J_{I,p} \quad (4)$$

the jitter components provided by the different crossed connection nodes being determined from the relationship (2).

Figure 7:
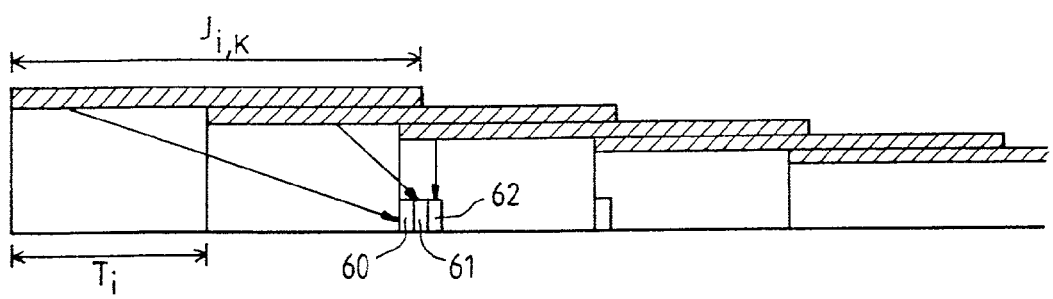
FIG. 7 shows the phenomenon of packet aggregation that can occur along a virtual path owing to the jitter introduced during the crossing of the interconnection nodes of a transmission network placed on this virtual path.

When the jitter affecting the packets of one and the same information flow, namely the packets following one and the same virtual paths $VC_i$, approach or go beyond the minimum period $E_i$ between the sending of two successive packets, an aggregation phenomenon may occur at the virtual path itself. Indeed, if the order of the packets following a virtual path cannot be modified since the packets follow one another on one and the same route within the transmission network which is a deterministic type of network, the packets cross one and the same interconnection node at different points in time with variable transit times depending on the occupation, at the time of their passage, of the queue of the output port that they take. Thus, after a packet that has taken a great deal of time to cross an interconnection node, the following packet of the same virtual path may take less time and so on and so forth. The result of this will be an aggregate of packets on the virtual path if the jitter affecting the virtual path at output is in the range of or is greater than the minimum period between two successive packets at transmission. FIG. 7 illustrates an example of an aggregation of packets that may occur in a virtual path having jitter at output that is slightly greater than twice the time interval $T_i$ between two successive packets when they are introduced into the virtual path. A first packet 60 undergoes a particularly lengthy processing time that is practically equal to the jitter because it crosses the interconnection nodes taken by the virtual paths at points in time when the queues are particularly loaded, and has a delay that is practically equal to twice the time interval $T_i$ between itself and the sending of the other packets. The packet that follows it catches up with it because it encounters more favorable conditions of transportation but it cannot overtake it so that it again undergoes a delay approximately equivalent to the time interval $T_i$ while the following packet 62 again encounters favorable transportation conditions and is practically no longer blocked by the packets that precede it on the virtual paths. The result is that, at the arrival point of the virtual path, there are time intervals $T_i$ that are empty whereas they should contain a packet and other time intervals that contain aggregates of packets whereas they should contain only one packet at a time.

More specifically, the maximum size of an aggregate $B_{VC_{l,i,k}}$ that might come to a virtual path $VC_i$ taking the input port $E_i$ of a Kth connection node K crossed by the virtual paths $VC_i$ is related to the sum of the jitter components $\Delta J_{i,k}$ that have accumulated on this virtual path $VC_i$ at the passage of the interconnection nodes encountered before this Kth interconnection node and to the minimum time interval TI between the packets when they are introduced into the virtual paths by the system of relationships:

$$\begin{cases} B_{VC_{l,i,k}} = 1 + \text{integer part}\left(\dfrac{\sum\limits_{k=1}^{K-1} \Delta J_{l,k}}{T_l}\right) \times q_{\max} & \text{for } \sum\limits_{k=1}^{K-1} \Delta J_{l,k} \geq T_l \, et \sum\limits_{k=1}^{K-1} \Delta J_{l,k} < T_l \dfrac{q_{\max}}{V} \\ B_{VC_{l,i,k}} = 2 & \text{for } T_l - \dfrac{q_{\max}}{V} \leq \sum\limits_{k=1}^{K-1} \Delta J_{l,k} < T_l \end{cases} \quad (5)$$

and the minimum time interval between such an aggregate and the next packet on the virtual paths $VC_i$, again at the input port $E_i$ of the Kth interconnection node crossed, has the following value:

$$\Delta T_l = T_l - \text{Remainder}\left(\dfrac{\sum\limits_{k=1}^{K-1} \Delta J_{l,k}}{T_l}\right) B_{VC_{l,k,j}} / V \quad (6)$$

at the input of the node k, it being known that an aggregate can occur only when the next packet has not been delayed in the queues that it has crossed. This packet is said to be in conformity if the distance between it and the aggregate is $\geq \Delta T_i$.

The maximum size Q of a queue upline from an output port $S_j$ of an interconnection node k, in the presence of a single burst of packets or aggregate of packets obtained previously (relationship (1)) can also be expressed as a function of the flows taking the N virtual paths $VC_i$ passing through the output port $S_j$ considered:

$$Q = \sum_{l=1}^{N} \text{Max aggregate size}_{VC_l} - $$

$$\text{Sup}\left\{\text{Max aggregate size max}_{VC_l \atop 1 \leq l \leq N}\right\}$$

The condition of equilibrium (relationship (3)), guaranteeing that this maximum size is not exceeded in the presence solely of the traffic of a virtual path $VC_i$, dictates the minimum time interval $\Delta T_l$ between two bursts:

$$\Delta T_l \geq \dfrac{B'_l}{V}$$

Now, owing to the relationship (6), this verifies the following condition:

$$\Delta T_l \geq T_l - \text{Remainder}\left(\dfrac{\sum\limits_{k=1}^{K-1} \Delta J_{l,k}}{T_l}\right) \dfrac{B_{VC_{l,k,j}}}{V}$$

So that the condition of equilibrium in the presence of a single virtual path becomes:

$$\dfrac{B_j}{V} \leq T_l - \text{Remainder}\left(\dfrac{\sum\limits_{k=1}^{K-1} \Delta J_{l,k}}{T_l}\right) \dfrac{B_{VC_{l,k,j}}}{V}$$

Since, furthermore, we have seen that the minimum time interval $\Delta T_I$ between two packets or aggregates of a virtual path $VC_i$ can occur only between an aggregate followed by an isolated packet, we have:

$$B'_l = q_{max}$$

Ultimately, the condition of equilibrium in the case of a single virtual path is written as follows:

$$\dfrac{q_{\max}}{V} \leq T_l - \text{Remainder}\left(\dfrac{\sum\limits_{k=1}^{K-1} \Delta J_{l,k}}{T_l}\right) \dfrac{B_{VC_{l,k,j}}}{V} \quad (7)$$

When there are several virtual paths, the minimum time interval to be complied with to prevent the maximum size $Q_{max}$ of a queue from being exceeded must take account of the interactions of the traffic of all the virtual paths going through the queue. In the most unfavorable case, where the contention is the maximum, all the virtual paths having maximum-sized aggregates of packets at the same time, the second burst will consist of isolated packets which do not always present themselves at the same time. It is therefore assumed that, at the end of the first burst, the queue reaches its maximum capacity and that, during the second burst, it receives N isolated packets or packets in conformity, of which only M are under constraint, i.e. they receive at least one bit. Thus, it can be ensured that the queue will not exceed its maximum capacity if the first packet of the second burst arrives at the end of a period of time $\Delta T$, after the first burst, sufficient for the queue to empty itself of M−1 packets. This amounts to assuming the following condition:

$$\Delta T \geq (M-1)\frac{q_{max}}{V} \qquad (8)$$

which is also expressed from the date $t_e$ of reception of the end of the first burst and the date $t_s$ of reception of the start of the second burst in the queue:

$$\Delta T = t_s - t_e \geq (M-1)\frac{q_{max}}{V}$$

Now, if we take the time reference to be the instant of the start of reception of the first burst in the queue, we have:

$$t_e = \frac{\text{Sup}\left\{\underset{1 \leq l \leq N}{\text{Max aggregate size }} VC_l\right\}}{V}$$

And $t_s = \underset{1 \leq j \leq M}{\min}\{t_j\}$ ($t_j$ being the instant of arrival in the queue of the jth contending packet of the second burst with reference to be instant of arrival of the first burst in the queue) so that the condition of equilibrium is written also as follows:

$$\underset{1 \leq j \leq M}{\min}\{t_j\} - \frac{\text{Sup}\left\{\underset{1 \leq l \leq N}{\text{Max aggregate size}}_{VC_l}\right\}}{V} \geq (M-1)\frac{q_{max}}{V}$$

This condition of equilibrium is expressed, for any one virtual path k of the virtual paths taking the queue, by the following condition on its minimum time interval $\Delta T_K$ $$\Delta T_k \geq (M-1)\frac{q_{max}}{V} + \frac{\text{Sup}\left\{\underset{1 \leq l \leq N}{\text{Max aggregate size}}_{VC_l}\right\}}{V} - \frac{\text{Max aggregate size}_{VC_k}}{V} \qquad (9)$$

The relationships that have just been established are used to size a deterministic type of packet-switching transmission network so that it meets the specific constraints of latency or time of transportation and of regularity of transportation or jitter imposed on the information flows that travel through its virtual paths.

The sizing of a deterministic type packet-switching transmission network is done by successive refining operations. First, an initial network topology is proposed. This initial network topology is a set of fixed virtual paths interconnecting the pieces of equipment to be linked and a meshing of interconnection nodes and physical connection links between interconnection nodes and between interconnection node and pieces of equipment that carry the virtual paths, appearing to be capable of adapting to the geographical layout of the equipment to be connected and having adequate performance for the quantities of information to be exchanged between the pieces of equipment. It is then ascertained that the proposed topology supports the different types of traffic expected with regard to the physical connection links, for which the bit rates must be sufficient to ensure the flow of local traffic using them, as well as with regard to the interconnection nodes for which the occupation of the queues must enable compliance with the constraints dictated by the equipment on the times and regularities of transportation of the information flows. So long as this verification does not provide conclusive answers, the proposed topology is revised at the virtual paths (their numbers and configuration) as well as at the interconnection nodes (number and capacity in terms of input and output ports) and the physical connection links (the number and bit rates) in seeking a certain degree of homogeneity between the different interconnection nodes and the different physical connection links.

The main difficulty lies in the step for verifying the proper matching of the proposed topology to the various constraints imposed. To successfully carry out this verification, it is proposed to perform an incremental determination, in descending along the virtual paths, of the jitter components added by the different interconnection nodes at their different output ports. This is done, first of all, by avoiding the problem of the possibility of queue congestion caused by successive bursts of packets excessively close to each other and then by verifying, at each virtual path, that such a problem does not arise. The knowledge of the jitter components added by the different interconnection nodes at their output ports makes it easy to determine the total jitter affecting each virtual path of the transmission network to find out if it is low enough to enable compliance with constraints on the time periods and regularity of transmission dictated by the equipment put into communication.

Indeed, the jitter component at one of the output ports $S_j$ of an interconnection node K may be determined by means of the relationship (2) from the maximum quantity Q of bits that can be placed in the queue of this output port and the transmission speed V. of the physical connection links starting from this output port:

$$\Delta J_{K,i} = \frac{Q}{V} = \frac{\sum_{i=1}^{N} B_i - \text{Sup}\{B_i\}}{V}$$

The transmission speed V. of the physical connection links starting from the output port is a piece of data derived from the characteristics of the physical link. The maximum quantity Q of bits of the queue may be determined by means of the relationship (1) as a function of the maximum sizes in bits $B_i$ of the aggregates of packets converging on the output port considered $S_j$:

$$Q = \sum_{l=1}^{N} B_l - \text{Sup}\{B_l\}$$

N being the number of packet flows liable to converge on the output port considered, namely the number of virtual paths reaching the interconnection node and converging on the output port $S_j$ considered, The maximum size in bits $B_i$ of an aggregate of packets can also be expressed by the relationship:

$$B_i = M_i \times q_{max}$$

$M_i$ being the maximum number of packets in an aggregate of packets and $q_{max}$ being the maximum number of bits of a packet. It is a piece of data at this incrementing level since it concerns the input ports of the interconnection nodes and therefore either output ports of interconnection nodes located upline on virtual paths that have undergone previous incrementing steps or output ports of the pieces of equipment.

More specifically, the maximum size $B_i$ in bits of an aggregate of packets likely to occur on a virtual path $VC_i$ in an interconnection node K of the network is taken to be equal to the size of the greatest aggregate of packets $B_{VC_{i,i,k}}$ likely to arise at the interconnection node K to converge on its output port $S_j$ on the virtual paths $VC_i$ taking an input node of the connection node K considered:

$$B_i = Sup\{B_{VC_{i,i,k}}\}$$

the size of the biggest aggregate of packets $B_{VC_{i,i,k}}$ likely to occur on the virtual paths $VC_i$ taking an input port of the connection node K considered being obtained from the system of relationships (5):

$$\begin{cases} B_{VC_{l,i,k}} = 1 + \text{integer part}\left(\dfrac{\sum_{k=1}^{K-1} \Delta J_{l,k}}{T_l}\right) \times q_{max} & \text{for } \sum_{k=1}^{K-1} \Delta J_{l,k} \geq T_l \, et \sum_{k=1}^{K-1} \Delta J_{l,k} < T_l \dfrac{q_{max}}{V} \\ B_{VC_{l,i,k}} = 2 & \text{for } T_l \dfrac{q_{max}}{V} \leq \sum_{k=1}^{K-1} \Delta J_{l,k} < T_l \end{cases}$$

K herein being the number of interconnection nodes crossed by a virtual path considered before arriving at the output port considered of the interconnection node studied and the index k identifying the connection nodes crossed upline by a virtual path considered in the order in which they are crossed by the packets.

It will be noted that the above system of relationships uses only jitter components $\Delta J_{l,k}$ relating to output ports of the interconnection nodes placed upline on the virtual paths considered and therefore determined during previous incrementing steps.

Once the jitter components added by the different interconnection nodes at their different output ports have been determined, it is verified, on each virtual path $VC_i$, that the minimum time intervals $\Delta T_{i,k}$ between the greatest aggregate and the next packet which is the earliest to reach the various interconnected nodes encountered, obtained by the relationship (6):

$$\Delta T_{l,K} = T_l - \text{Remainder}\left(\dfrac{\sum_{k=1}^{K-1} \Delta J_{l,k}}{T_l}\right) \dfrac{B_{VC_{l,k,j}}}{V}$$

are sufficient to prevent any problem of congestion of the queues caused by excessively close bursts, namely that they satisfy either the inequality (8):

$$\Delta T \geq (M-1)\dfrac{q_{max}}{V}$$

M being a positive integer at most equal to the number of virtual paths taking the node output port considered, chosen as a function of the degree of security required for transmission, or the inequality (9):

$$\Delta T_k \geq (M-1)\dfrac{q_{max}}{V} + \dfrac{\underset{1 \leq l \leq N}{Sup\{\text{Max aggregate size}_{VCl}\}}}{V} - \dfrac{\text{Max aggreagate size}_{VC_k}}{V}$$

Once these conditions are met, the estimations of the different jitter components are accepted, and they are used to determine the jitter affecting each virtual path and verify that it is compatible with the constraints of latency and regularity imposed on the different information flows exchanged between the pieces of equipment. The conditions and constraints that are not met bring the proposed topology into question, and this proposed topology is modified until they are met.

Figure 8:
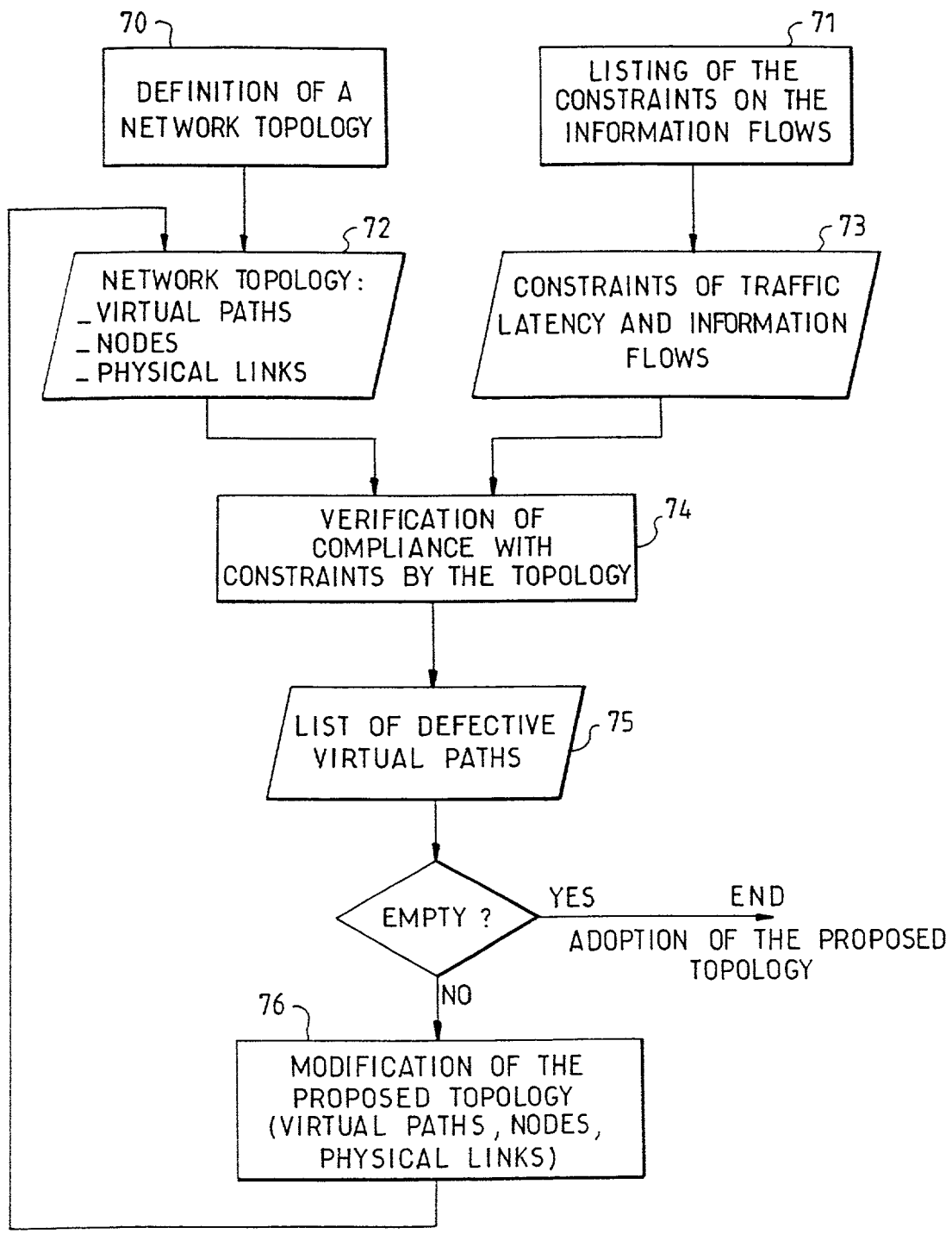
FIG. 8 is a flow chart illustrating the main steps of a process of network sizing according to the invention.

FIG. 8 is a flow chart illustrating the main steps of the method for sizing a packet-switched transmission network implementing the above method for the verification of conformity. This flow chart starts with two separate tasks, one task 70 proposing a deterministic type of packet-switching transmission network topology taking account of the geographical location of the pieces of equipment to be connected and the size of the flows of information to be exchanged between them, while the other task 71 is an inventory task, listing the constraints of latency and regularity of traffic that must be complied with by the information flows exchanged between pieces of equipment through the network. The task 70 for proposing a network topology makes a proposal, in the form of the data table 72, for a deterministic network plan with fixed virtual paths, at least one per information flow, and a meshing of interconnection nodes connected to one another and to the pieces of equipment by physical connection links on which the different virtual paths are plotted in a fixed manner. The inventory task 71 makes a list, in the form of the data table 73, of the constraints of latency and traffic to be complied with by the different information flows, hence by the different virtual paths conveying these flows. The two data tables 72 and 73 pertaining to the topology proposed for the network and to the transmission constraints associated with the different information flows to be transmitted are then used in a task 74 for verifying the matching of the topology proposed with the different constraints. This task 74, according to the method just described, incrementally determines the jitter components provided by the interconnection nodes at their different output ports. From these jitter components, it deduces the jitter affecting the different virtual paths proposed. It verifies that the minimum time intervals $\Delta T_{I,K}$ between two packets or aggregates of packets on each virtual path and at the various interconnection nodes encountered are sufficient so that the determining of jitter amplitudes will not be brought into question. The task 74 generates a list, in form of a data table 75, of virtual paths that pose a problem either because they do not comply with the minimum time intervals between packets or aggregates of successive packets or because they are affected by jitter that is far too great to comply with the latency times or the constraints of regularity imposed on the information flows that they conveying, with a list of the interconnection node output ports at which these problems have been detected for the first time in the course of each of the virtual paths. This table 75, with its list of problem-causing virtual paths and output ports of the interconnection nodes at which the problems detected on the virtual paths appear, is then used by a network topology modifying task 76. This task 76 proposes a new routing of the problem-causing virtual paths without modifying the meshing of the interconnection nodes and the physical connection links when these problems can be resolved by a redistribution of the resources of the network between the different virtual paths or by modifying the meshing of the network by adding new physical links between the interconnection nodes, increasing the number of input or output ports of certain interconnection nodes or even by adding new interconnection nodes. This task 76 delivers a new proposal of topology for the network which takes the place of the preceding one in the data table 72. This table 72 in turn is subjected to the verification task 74. This is done until the data table 75 listing the problem-causing virtual paths is empty.

What is claimed is:

1. A method for the sizing of a deterministic type of packet-switching transmission network serving items of equipment to be interconnected and comprising interconnection nodes connected to one another and to the items of equipment by physical connecting links, this method consisting in setting up a list of the information flows to be conveyed between the different pieces of equipment connected by the network, proposing a network topology assumed to be adapted to the geographical layout of the items of equipment to be connected by the network and to the size of the information flows to be exchanged between the items of equipment, said network topology consisting of the definition of the virtual paths for the transportation of the different information flows and of a meshing of interconnection nodes connected to one another and to the items of equipment by physical connection links that carry these virtual paths, estimating, at each connection node, the maximum delays introduced into the transmissions of the packets by jitter phenomena prompted by themselves and by the connection nodes already crossed by the packets, ascertaining that these maximum delays are compatible with the delays imposed and revising the topology of the network so long as this compatibility is not obtained, wherein, in a network where the packets all have the same speed of transportation V on the physical connection links connecting the interconnection nodes to each other and to the items of equipment, the estimation of the maximum delay times introduced by the jitter phenomenon entails the determining of the jitter component $\Delta J_{K_j}$, added by an interconnection node K at one of its output ports $S_j$ linked, by means of a buffer memory receiving a queue and a multiplexing device, with N of its input ports $E_i$, this determination of the component of the jitter $\Delta J_K$, being done when each packet of a virtual path $VC_i$ entering the buffer memory by an input port $E_i$ has, between an aggregate of packets and the following packet or aggregate of packets, a minimum time interval sufficient to empty the buffer memory to prevent its overflow at the reception of the following packet or aggregate of packets, by the implementation of the following relationship:

$$\Delta J_{K_l} = \frac{Q}{V} = \frac{\sum_{l=1}^{N} B_l - \text{Sup}\{B_l\}}{V}$$

Q being the maximum quantity of bits of the queue estimated from the relationship:

$$Q = \sum_{l=1}^{N} B_l - \text{Sup}\{B_l\}$$

N being the number of packet flows liable to converge on the output port considered, namely the number of flows crossing the interconnection node and converging on the output port $S_j$ considered, $B_i$ being the maximum size in bits of an aggregate of packets likely to reach a $VC_i$ by an input port $E_i$, it being possible to express this maximum size also by the relationship:

$$B_l = M_l \times q_{max}$$

$M_i$ being the maximum number of packets in an aggregate of packets capable of arriving at the virtual path $VC_i$ through an input port $E_i$ and $q_{max}$ being the maximum number of bits of a packet.

2. A method according to claim 1, wherein the maximum size $B_i$ in bits of an aggregate of packets likely to arrive at a virtual path $VC_i$ by an input port $E_i$ of an interconnection node of the network is taken to be equal to the size of the greatest aggregate of packets $B_{VC_{l,i,k}}$ that may arise on this virtual path $VC_i$ that takes the input port $E_i$ of the connection node K considered:

$$B_l = \text{Sup}\{B_{VC_{l,i,k}}\}$$

the size of the biggest aggregate of packets $B_{VC_{l,i,k}}$ that may arise on a virtual path $VC_i$ that takes the input port $E_i$ of the connection node K considered being obtained from the system of relationships:

$$\begin{cases} B_{VC_{l,i,k}} = 1 + \text{integer part}\left(\dfrac{\sum_{k=1}^{K-1} \Delta J_{l,k}}{T_l}\right) \times q_{\max} & \text{for } \sum_{k=1}^{K-1} \Delta J_{l,k} \geq T_l \, et \sum_{k=1}^{K-1} \Delta J_{l,k} < T_l - \dfrac{q_{\max}}{V} \\ B_{VC_{l,i,k}} = 2 & \text{for } T_l - \dfrac{q_{\max}}{V} \leq \sum_{k=1}^{K-1} \Delta J_{l,k} < T_l \end{cases}$$

K herein being the number of connection nodes crossed by a virtual path considered and the index k identifying the connection nodes crossed by a virtual path considered in the order in which they are crossed by the packets, the different jitter components $\Delta J_{l,k}$ being determined from one to the next in travelling through the different virtual paths from their original points to their end points.

3. A method according to claim 2 wherein, once the jitter components added by the different interconnection nodes at their different output ports have been determined, it is verified, on each virtual path $VC_i$, that the minimum time intervals $\Delta T_{l,K}$ between the biggest aggregate of packets and the next packet that reaches the different interconnection nodes encountered at the earliest, obtained by the relationship:

$$\Delta T_{l,K} = T_l - \text{Remainder}\left(\dfrac{\sum_{k=1}^{K-1} \Delta J_{l,k}}{T_l}\right)\dfrac{B_{VC_{l,k,j}}}{V}$$

are sufficient to prevent any problem of congestion of the queues caused by bursts excessively close to each other, in finding out whether they meet the inequality:

$$\Delta T \geq (M-1)\dfrac{q_{\max}}{V}$$

M being a positive integer at most equal to the number of virtual paths taking the output port of the interconnection node considered, chosen as a function of the degree of security required for the transmission.

4. A method according to claim 2 wherein, once the jitter components added by the different interconnection nodes at their different output ports have been determined, it is verified, on each virtual path $VC_i$, that the minimum time intervals $\Delta T_{l,K}$ between its biggest aggregate of packets and the next packet that reaches the different interconnection nodes encountered at the earliest, obtained by the relationship:

$$\Delta T_{l,K} = T_l - \text{Remainder}\left(\dfrac{\sum_{k=1}^{K-1} \Delta J_{l,k}}{T_l}\right)\dfrac{B_{VC_{l,k,j}}}{V}$$

are sufficient to prevent any problem of congestion of the queues caused by bursts excessively close to each other, in finding out whether they meet the inequality:

$$\Delta T_k \geq (M-1)\dfrac{q_{\max}}{V} + \dfrac{\text{Sup}\{\text{Max aggregate size}_{VCl}\}_{1 \leq l \leq N}}{V} - \dfrac{\text{Max aggreagate size}_{VC_k}}{V}$$

for a $VC_k$,

M being a positive integer at most equal to the number of virtual paths taking the output port of the interconnection node considered, chosen as a function of the degree of security required for the transmission.

* * * * *